United States Patent [19]

Gonzales

[11] 4,180,713
[45] Dec. 25, 1979

[54] SWITCH CONTROL UNIT FOR AUTOMOBILE VEHICLE

[75] Inventor: Boris Gonzales, Issy-les-Moulineaux, France

[73] Assignee: Societe Anonyme Automobiles Citroen, Paris, France

[21] Appl. No.: 871,750

[22] Filed: Jan. 23, 1978

Related U.S. Application Data

[63] Continuation of Ser. No. 698,680, Jun. 22, 1976, abandoned.

[30] Foreign Application Priority Data

Jun. 25, 1975 [FR] France .................................. 75 19965

[51] Int. Cl.² ....................... H01H 9/00; B60K 37/06; B60R 18/00; H01H 25/06
[52] U.S. Cl. ................................ 200/52 R; 180/77 H; 200/61.27; 200/157; 361/331
[58] Field of Search .................. 200/61.27, 61.54, 157; 361/331, 346; 74/479, 491, 493, 484 R, 552; 180/77 H, 78

[56]  References Cited
U.S. PATENT DOCUMENTS

| 1,787,684 | 1/1931 | Jacobi | 361/331 X |
|---|---|---|---|
| 2,641,629 | 6/1953 | Bennett, Jr. | 74/484 UX |
| 2,658,132 | 11/1953 | Welch | 200/157 X |
| 2,863,015 | 12/1958 | Ahrens | 200/61.54 |
| 3,019,311 | 1/1962 | Moffitt et al. | 200/61.27 |
| 3,142,227 | 7/1964 | Stringer | 200/157 X |
| 3,216,521 | 11/1965 | Ulrich | 74/493 X |
| 3,544,743 | 12/1970 | Takei et al. | 200/61.54 |
| 3,548,128 | 12/1970 | Willett | 200/61.57 |
| 3,750,080 | 7/1973 | Rouvre et al. | 200/4 |
| 3,867,600 | 2/1975 | Phillips | 200/157 |
| 4,131,772 | 12/1978 | Weckenmann et al. | 200/61.54 |

FOREIGN PATENT DOCUMENTS

| 1905774 | 8/1970 | Fed. Rep. of Germany | 200/61.54 |
|---|---|---|---|
| 1005743 | 9/1965 | United Kingdom | 200/61.54 |

Primary Examiner—James R. Scott
Attorney, Agent, or Firm—Fitzpatrick, Cella, Harper & Scinto

[57]  ABSTRACT

This invention relates to a control unit for a vehicle having a steering wheel and is constituted by a box provided with vehicle accessory control and checking means. The control members several types of manually operable switches arranged and disposed for operation by a driver while his hands remain on the steering wheel, the switches being recognizable by touch.

7 Claims, 5 Drawing Figures

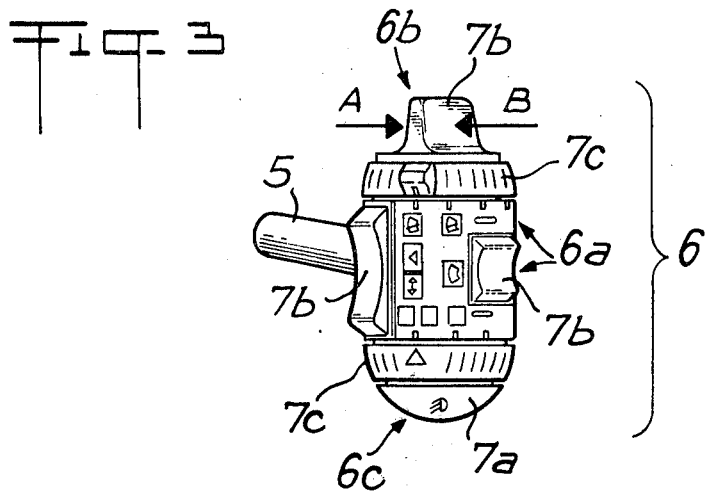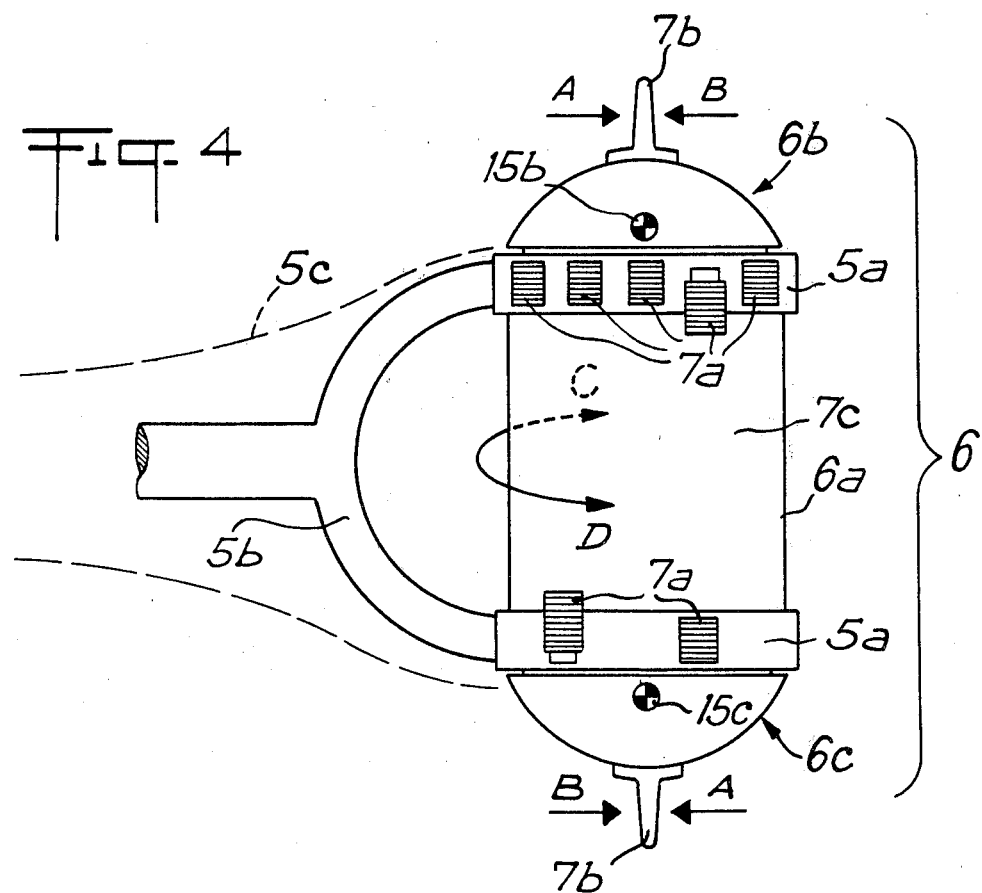

4,180,713

SWITCH CONTROL UNIT FOR AUTOMOBILE VEHICLE

This is a continuation, of application Ser. No. 698,680 filed 6.22.76 now abandoned.

BACKGROUND OF THE INVENTION

1. Field of the Invention

The present invention relates to a control unit for the interior of an automobile vehicle, comprising a series of members controlling the equipment of this vehicle grouped together near the steering member.

2. Description of the Prior Art

Vehicle controls are known which are disposed, at least partly, particularly those most frequently used, in the immediate vicinity of the steering wheel within reach of the driver without his having to take his hands from the wheel. These controls are in several separate groups to the left and right of the steering wheel, either on the instrument panel or connected to the steering column.

Other members for controlling or checking the functioning of this equipment are located further away from the driver and arranged relatively sparsely, for example in the portion of the instrument in his line of vision.

The partial dispersion of this equipment requires visual recognition preceding recognition by touch for identification and operation thereof. This means that the driver's attention is distracted, which may lead to errors in steering.

SUMMARY OF THE INVENTION

It is an object of the present invention to remedy this drawback and to this end it proposes a device for which simple recognition of the controls by touch is sufficient to ensure correct operation thereof.

The invention therefore relates to a control unit for the interior of an automobile vehicle, provided with a steering means such as a steering wheel intended to carry at least part of the controls grouped thereon. According to the invention, this control unit is constituted by a compact, oblong box comprising, between two ends, a central portion of substantially cylindrical form, which is connected laterally to a support, itself fast with one of the fixed elements of the vehicle interior; the controls are constituted by hand-operated switches of three different types, the direction of actuation of the switches of the first type being orientated along the large axis of the box, that of the switches of the second type being perpendicular to this large axis and that of the switches of the third type being of revolution about this axis.

In a first embodiment of the present invention, the box is pivotally fixed to the support in the manner of a swivel joint.

In accordance with a second embodiment, the support is fixed to the vehicle via an articulation of the swivel joint type.

In addition, the support may be telescopic.

Furthermore, the support may be hollow and may constitute a sheath for the electric control circuits connected to the switch members.

Finally, the control circuits inside the arm are equipped at their end opposite the controls, with at least one instant connector with multiple plugs, capable of cooperating, by fitting, with a corresponding connector coupled with the fixed element inside the vehicle.

BRIEF DESCRIPTION OF THE DRAWINGS

The invention will be more readily understood on reading the following description with reference to the accompanying drawings, in which:

FIGS. 3 and 4 each illustrate a variant embodiment of the box;

DESCRIPTION OF THE PREFERRED EMBODIMENTS

Figure 1:
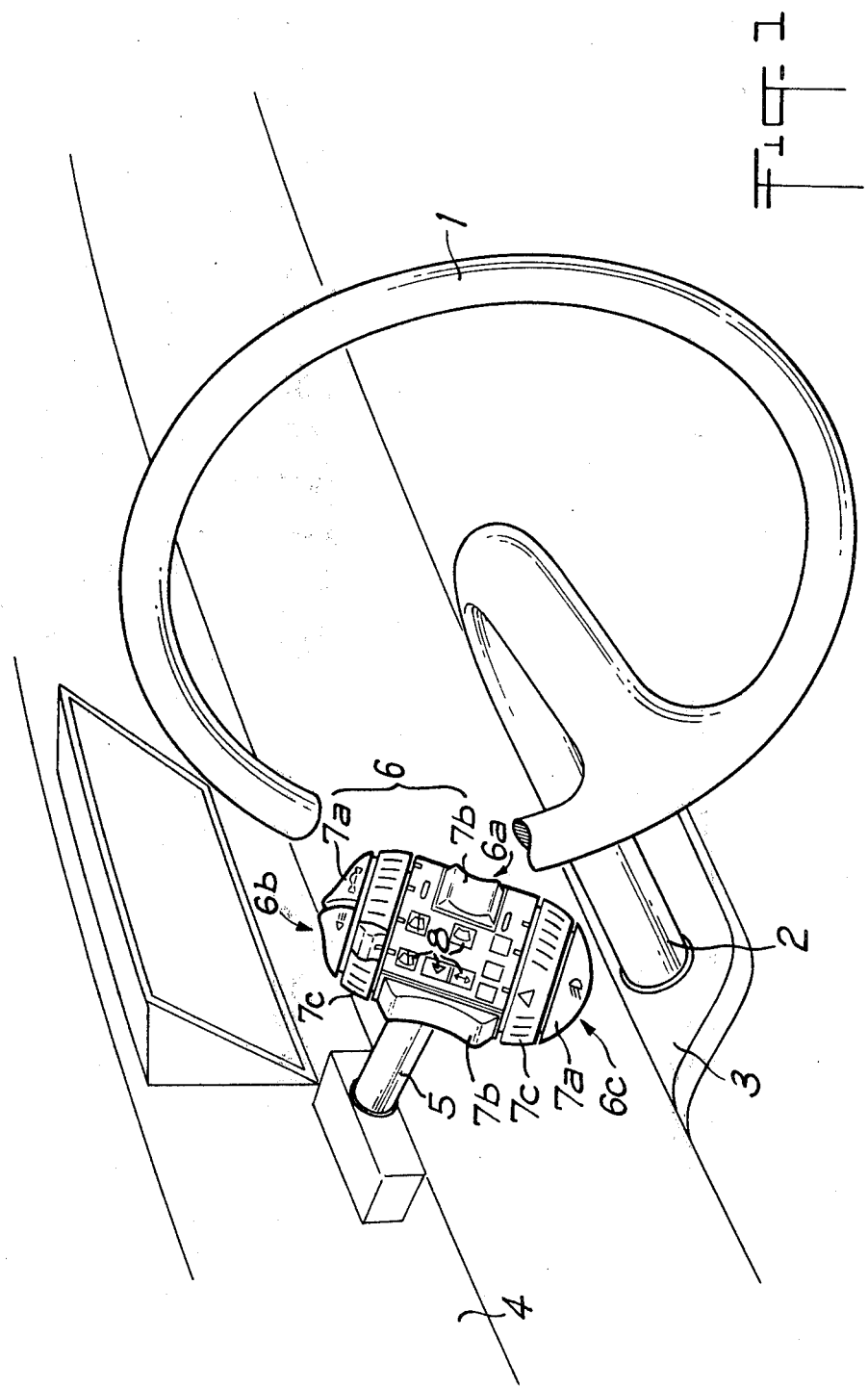
FIGS. 1 and 2 are two views illustrating two embodiments of a control unit according to the invention.
Figure 2:
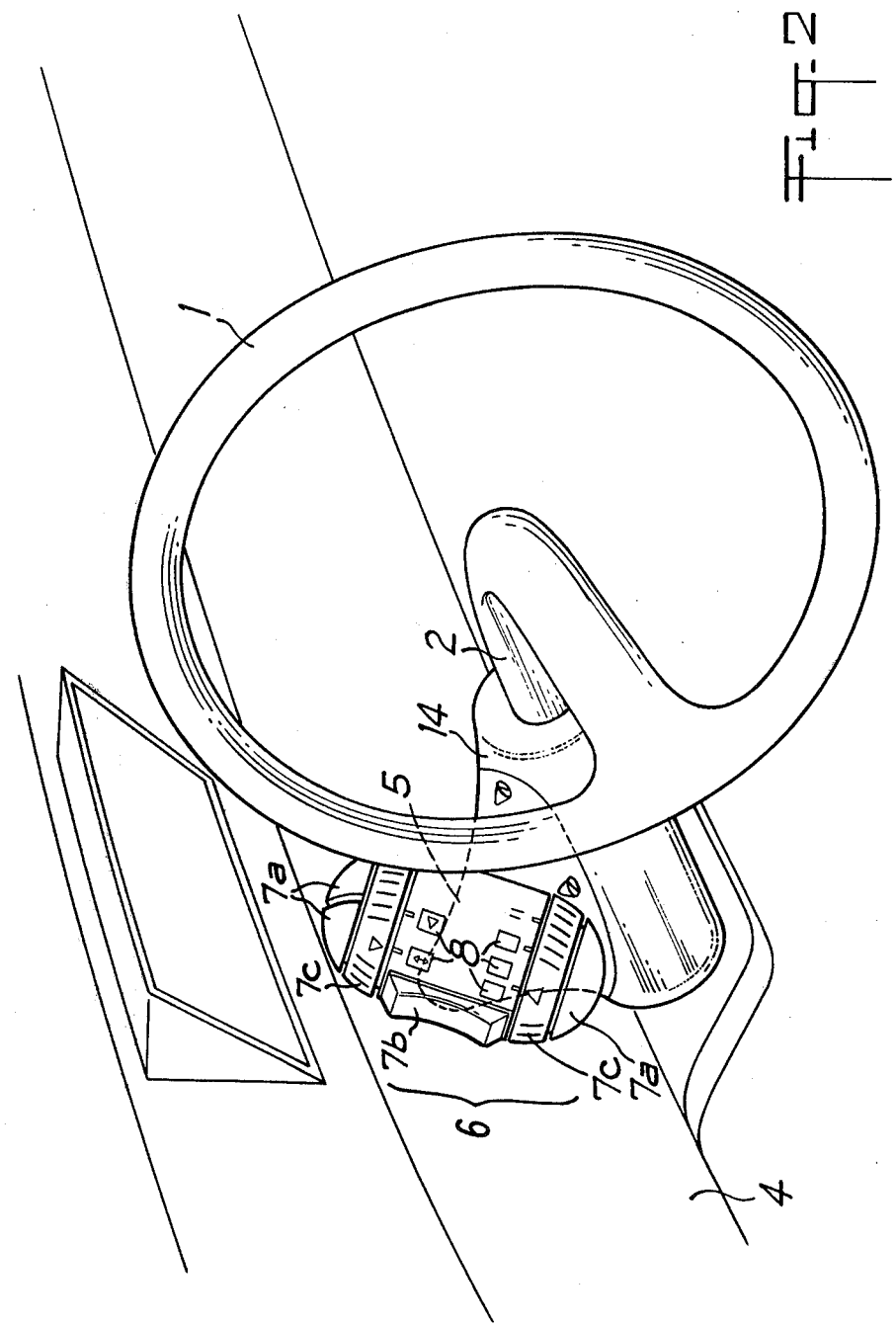

Referring now to the drawings, FIGS. 1 and 2 are partial views of the interior of a vehicle, showing a means for steering this vehicle, shown in the form of a steering wheel 1 connected to a steering column 2. The latter is held in the interior by a fixed element 3 fast with the instrument panel 4. On the panel 4 has been fixed the support 5 of a box 6 carrying members 7 for controlling the equipment of the vehicle, such as direction indicators, lights, horn, flasher, windscreen wiper . . . and members 8 for checking the functioning of this equipment.

The box 6 is oblong in shape, with a substantially cylindrical central portion 6a and spherical ends 6b and 6c. The control elements 7 are constituted by hand-operated switches of three different types. Those switches 7a of the first type are actuated in the direction of the large axis or the largest dimension of the box 6. Those switches 7b of the second type are actuated in a direction substantially perpendicular to the large axis. Finally, those switches 7c of the third type are actuated by revolving lution about the large axis. FIG. 1 shows that switches 7a are borne by the ends 6b and 6c of the box 6, that switches 7b are located on the central part 6a of the box and that switches 7c are disposed at the junction of the box ends 6b and 6c with its central portion 6a.

The support 5 may be constituted by a telescopic arm. In this way, the driver can adjust the position of the box 6 with respect to the steering wheel, to have it within reach. In addition, the box is connected to the support, in manner known per se and not shown in the drawings, via an articulation of the swivel joint type in order to allow adjustment of the box 6 with respect to the steering wheel 1 in a plane parallel to that of the steering wheel and in a plane perpendicular to this latter. Finally, the support 5 may also be fixed on the instrument panel by a system of the swivel joint type, this further increasing the possibilities of adjustment of the position of the box 6 in space with respect to the steering wheel 1.

Figure 5:
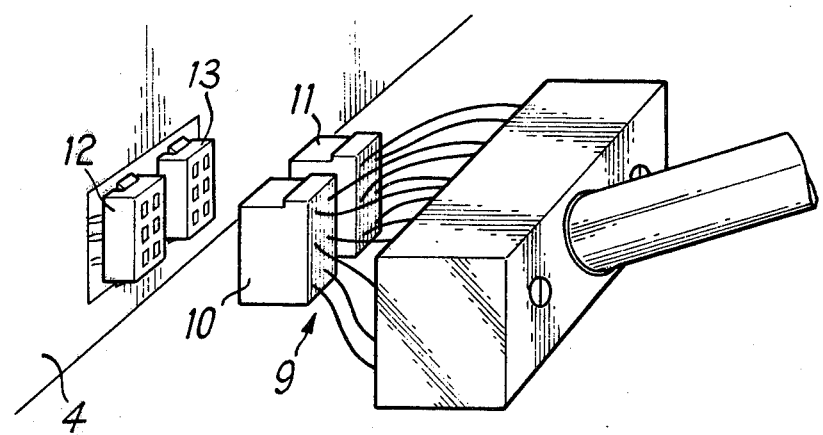
FIG. 5 is a detailed view of FIG. 1.

Furthermore, it will be noted that the support 5 may be hollow and constitute a sheath for electric control circuits connected to the switches 7. In this case, as illustrated in FIG. 5, the end 9 of the circuits opposite the members is equipped with multiple plug connectors 10 and 11 cooperating, by simple fit or assisted by a locking known per se, with corresponding connectors 12 and 13 on the instrument panel.

In the embodiment of FIG. 2, it will be noted that the support 5 is connected to a casing 14 of the steering column 2. The connection of the wires in the support 5 is effected with corresponding wires provided in the casing 14 also by means of multiple plug connectors. In FIG. 3, it will be noted that the switches 7b of the second type are on the one hand borne on the central part 6a of the box 6 and, on the other hand, on one of the ends 6b of this box. In fact, the element borne by the end 6b may be actuated by rocking in the direction of arrows A and B, therefore it is clearly seen that they extend in a direction perpendicular or substantially perpendicular to the large axis of the box 6. The other switches 7a and 7c may be actuated in the same manner as those shown in FIGS. 1 and 2 with the same references.

FIG. 4 schematically shows another embodiment of the box 6. The switches 7a are, in this variant, disposed substantially at the junction of the central part 6a of the box 6 with each of the ends 6b and 6c of this box. The switches of type 7b are in this embodiment, all borne by the ends 6b and 6c of the box. Their actuation in the direction of arrows A or B leads to a rocking of the ends about axes of articulation referenced 15b and 15c respectively. In this Figure, the switches 7c are constituted by the outer envelope, itself constituting the central portion 6a of the box. This envelope is mounted to rotate about the large axis of the box 6 and may be actuated in the direction of the two arrows C and D between two end rest positions. In fact, the guiding of this part 6a of the box 6 in rotation is ensured by fixed annular elements 5a extending in the zone of junction of the central part with the ends 6b and 6c of the box, which elements 5a are fast with a fork 5b constituting the reinforcement of the support 5, which may be covered with a covering such as symbolized by the broken line 5c. In a variant embodiment (not shown) of a switch of type 7c borne by the central part of the box, one can imagine a ring projecting circumferentially in the median zone of the part 6a, the ring being mounted to rotate between two end positions on the part 6a which would not be rotatable. Such a switch 7c borne by the central part of the box must be operated in practice with the palm of the hand or the inside of the fingers and, consequently, only two end rest positions of the switch can be envisaged for this operation to be effected almost automatically.

The main advantage of the invention results from the shape of the box 6. In fact, as it comprises a substantially cylindrical central part 6a and two spherical end portions 6b and 6c, it enables a large number of control members 7 to be grouped on a surface of much reduced volume. It also allows a very clear differentiation of the modes of actuating each type of switch 7a, 7b, 7c, by placing within hand reach three directions of actuation which are impossible to confuse as they are so different. It will be noted that each switch of the same type may have signs allowing recognition by touch, such as in particular its shape or surface, peculiar thereto. In summary, the shape of the box 6 as defined previously, advantageously enables a large number of controls to be locally grouped together, hence they are within easy reach and are easy to manipulate, while avoiding false operations by a very clear distinction of each of the directions of actuation of these members.

One of the secondary advantages of the invention resides in the fact of grouping the control members very closely, allowing bundles of electrical circuits to be made which are easily connectable with corresponding circuits by means of suitable connectors. The very fact of this localised grouping results in a considerable rationalisation of the installing or dismantling of such a device, this being very advantageous in the case of repair.

In this way, a control unit is made which is almost independent of other elements constituting the vehicle, at least as far as its installation and dismantling is concerned.

The invention finds advantageous application in the field of automobile construction.

What is claimed is:

1. In an automobile vehicle provided with a steering wheel, with electrical means for controlling and checking the operation of various accessories of said vehicle and with a control unit constituted by a compact box located near said steering wheel and comprising a central part and two ends, a support attached to a fixed member of said vehicle and orientable and extendable with respect to said fixed member, said box being laterally connected to said support, said control means being constituted by hand-operated switches electrically connected by wires to said accessories and located and borne by said central part and said ends of said box, an improvement of said control unit in which said central part is substantially cylindrical and at least one of said switches is borne on said box to have rotatable direction of actuation about the axis of said cylindrical central part.

2. Improvement of the control unit as claimed in claim 1, wherein said at least one of switches is of annular form and rotatably borne by the box between one of said ends and said central part.

3. Improvement of the control unit as claimed in claim 1, wherein said at least one of switches is constituted by said central part of the box, mounted to rotate on the said support about said axis of the box between at least two end rest positions, the other switches being located on said ends parts and on extensions of said support surrounding the ends of said central part.

4. Improvement of the control unit as claimed in claim 1, wherein said support is telescopic.

5. Improvement of the control unit as claimed in claim 1, wherein the said fixed member is a front partition forming an instrument panel.

6. Improvement of the control unit as claimed in claim 1 wherein said fixed member is the casing of the steering column.

7. Improvement of the control unit as claimed in claim 1, wherein said support is secured to said fixed member through a swivel joint for adjustment of the position of said box relative to said steering wheel.

* * * * *